(12) United States Patent
Pang et al.

(10) Patent No.: US 8,560,847 B2
(45) Date of Patent: Oct. 15, 2013

(54) LIGHT ACCESS AUTHENTICATION METHOD AND SYSTEM

(75) Inventors: Liaojun Pang, Xi'an (CN); Jun Cao, Xi'an (CN); Manxia Tie, Xi'an (CN); Zhenhai Huang, Xi'an (CN)

(73) Assignee: China Iwncomm Co., Ltd., Xi'an (CN)

( * ) Notice: Subject to any disclaimer, the term of this patent is extended or adjusted under 35 U.S.C. 154(b) by 418 days.

(21) Appl. No.: 12/745,288

(22) PCT Filed: Dec. 2, 2008

(86) PCT No.: PCT/CN2008/073288
§ 371 (c)(1),
(2), (4) Date: May 28, 2010

(87) PCT Pub. No.: WO2009/074092
PCT Pub. Date: Jun. 18, 2009

(65) Prior Publication Data
US 2010/0313012 A1     Dec. 9, 2010

(30) Foreign Application Priority Data
Dec. 3, 2007  (CN) .......................... 2007 1 0188466

(51) Int. Cl.
*H04L 9/28* (2006.01)
*H04K 1/00* (2006.01)

(52) U.S. Cl.
USPC .......................................... 713/168; 380/279

(58) Field of Classification Search
None
See application file for complete search history.

(56) References Cited

U.S. PATENT DOCUMENTS

| | | | |
|---|---|---|---|
| 5,966,449 A * | 10/1999 | Iwamura et al. | 380/44 |
| 6,724,893 B1 * | 4/2004 | Petro | 380/286 |
| 6,957,199 B1 * | 10/2005 | Fisher | 705/78 |
| 7,095,851 B1 * | 8/2006 | Scheidt | 380/44 |
| 7,394,902 B2 | 7/2008 | Yamamichi et al. | |
| 7,398,393 B2 | 7/2008 | Mont et al. | |
| 2002/0025046 A1 | 2/2002 | Lin | |
| 2004/0071293 A1 | 4/2004 | Yamamichi et al. | |
| 2004/0165728 A1 | 8/2004 | Crane et al. | |
| 2005/0039031 A1 | 2/2005 | Mont et al. | |
| 2005/0066174 A1 * | 3/2005 | Perlman | 713/176 |

(Continued)

FOREIGN PATENT DOCUMENTS

| | | |
|---|---|---|
| CN | 1472914 A | 2/2004 |
| CN | 1565002 A | 1/2005 |

(Continued)

OTHER PUBLICATIONS

Extended European Search Report regarding Application No. 08859953.5-2415 / 2219319, dated Jun. 25, 2012.

(Continued)

*Primary Examiner* — Christopher Revak
(74) *Attorney, Agent, or Firm* — Harness, Dickey & Pierce, P.L.C.

(57) ABSTRACT

A light access authentication method and system, the method includes: the trustful third party writes the MSG cipher text formed by enciphering MSG into the first entity; the second entity attains the MSG cipher text from the first entity, and attains the key from the trustful third party after attaining the MSG cipher text; the MSG cipher text is deciphered according to the key, and the MSG plaintext is attained. The embodiment of the present invention can be widely applied at a condition limited by the equipment and environment, and the access authentication is simplified and lightened.

10 Claims, 3 Drawing Sheets

(56) References Cited

U.S. PATENT DOCUMENTS

| | | | |
|---|---|---|---|
| 2005/0154890 A1 | 7/2005 | Vembu | |
| 2005/0251691 A1* | 11/2005 | Haufe | 713/189 |
| 2006/0020783 A1* | 1/2006 | Fisher | 713/156 |
| 2006/0072745 A1 | 4/2006 | Fukaya | |
| 2006/0105741 A1 | 5/2006 | Suh et al. | |
| 2007/0160202 A1* | 7/2007 | Wilt et al. | 380/30 |

FOREIGN PATENT DOCUMENTS

| | | |
|---|---|---|
| CN | 1588436 A | 3/2005 |
| CN | 1692600 A | 11/2005 |
| CN | 1777097 A | 5/2006 |
| CN | 101170411 A | 4/2008 |
| EP | 1626363 A1 | 2/2006 |
| EP | 2209254 A1 | 7/2010 |
| GB | 2398712 A | 8/2004 |
| GB | 2398713 A | 8/2004 |
| GB | 2434947 A | 8/2007 |
| JP | 2002056140 A | 2/2002 |
| JP | 2003501712 A | 1/2003 |
| JP | 2005529569 A | 9/2005 |
| JP | 2011504318 A | 2/2011 |
| KR | 1019970064233 A | 9/1997 |
| KR | 20060055406 A | 5/2006 |
| RU | 2184390 C1 | 6/2002 |
| WO | WO-0074300 A1 | 12/2000 |
| WO | WO-03001764 A1 | 1/2003 |
| WO | WO-03107584 A1 | 12/2003 |
| WO | WO-2006/075146 A1 | 7/2006 |

OTHER PUBLICATIONS

Toshiharu Ishikawa et al. "White Paper. Applying Auto-ID to the Japanese Publication Business to Deliver Advanced Supply Chain Managment, Innovative Retail Applications, and Convenient and Safe Reader Services." Auto-ID Center Keio University, Kanagawa, Japan. Oct. 1, 2003.

Damith C. Ranasinghe et al. "Security and Privacy Solutions for Low-Cost RFID Systems." Dec. 14, 2004.

Stephen A. Weis et al. "Security and Privacy Aspects of Low-Cost Radio Frequency Identification Systems." Security in Pervasive Computing. Jan. 27, 2004.

Korean Notice of Allowance regarding Application No. 10-2010-7014627, dated Jan. 19, 2012. Translation provided by Unitalen Attorneys at Law.

Russian Decision on Grant regarding Application No. 2010126781, dated Sep. 6, 2011. Translation provided by Unitalen Attorneys At Law.

Kiyoshi Ohgishi et al. "Notes on ID-based Key Sharing Systems over Elliptic Curve." The Institute of Electronics, Information and Communication Engineers. Technical Report of IEICE. ISEC99-57 Nov. 1999.

Dan Boneh and Matt Franklin. "Identity-Based Encryption from the Well Pairing." Advances in Cryptology—CRYPTO Aug. 2001. Elliptic Curves.

Shigeo Tsuju and Masao Kasahara. "Encryption and Information Security." Japan. Shokodo Co., Ltd. Feb. 20, 1996. First edition, fourth printing, pp. 139-141. Translation provided by Unitalen Attorneys at Law.

* cited by examiner

| PKeyID | CP | CMSG |
|---|---|---|

Figure 2

| ID2 | TTP | PKeyID | Nonce |
|---|---|---|---|

Figure 3

| ID2 | TTP | CSPKeyID | CP1 | Nonce | MIC |
|---|---|---|---|---|---|

Figure 4

LIGHT ACCESS AUTHENTICATION METHOD AND SYSTEM

The present invention claims priority to Chinese Patent Application No. 200710188466.9, filed with the Chinese Patent Office on Dec. 3, 2007, titled "A LIGHT ACCESS AUTHENTICATION METHOD", the entire content of which is incorporated herein by reference.

FIELD OF THE INVENTION

Embodiments of the present invention relate to a light access authentication method and a system thereof.

BACKGROUND OF THE INVENTION

For the wireless network (such as the Wireless Local Area Network (WLAN) or the Wireless Metropolitan Area Network (WMAN)), the security problem is much more serious than that of the wired Ethernet. The Radio Frequency Identification label (RFID) also faces the security problem. The problem of security authentication and key negotiation between the reader/writer and the electronic label in the RFID must be effectively addressed before secure communication.

Generally, electronic labels may be classified into three types depending on using situations and application environments: 1) a readable and writable high-level electronic label with certain storage space and calculation capacity; 2) a mid-level electronic label with similar functions as the high-level electronic label except for a little bit lower performance; and 3) a low-level electronic label, which is only used to record some data information and ensures the information being readable to a reader/writer. Generally, the low-level electronic label has no capacity of storage, calculation and information rewriting. Price labels of commodities in the supermarket belong to low-level electronic labels.

For the former two types of electronic labels, the security of the channel between the electronic label and the reader/writer can be ensured through an authentication protocol. For the third type of electronic label, it is not practicable to achieve the security through the existing authentication scheme, because this type of electronic label itself as media merely storing information has neither calculation and storage capacity nor identity information, etc. . . . . For example, the security schemes such as the WLAN Authentication and Privacy Infrastructure (WAPI) security protocol in the WLAN, the IEEE802.11i and the WMAN IEEE802.16e and so on require all parties of the protocol to have basic performance of calculation and storage, etc. Therefore, such security schemes may be applied to the former two electronic labels more or less, but may not be applied to the third electronic label at all. Therefore, the security of the third type of electronic label described above must be implemented by a new designed security scheme.

SUMMARY OF THE INVENTION

In view of the above, an object of the present invention is to provide a light access authentication method and a system thereof to achieve the security of an electronic label which has no calculation and storage capacity and identity information.

The technical solution of the present invention provides a light access authentication method, including the steps of:

writing, by a trusted third party, a MSG cipher text obtained by enciphering an MSG into a first entity;

obtaining, by a second entity, the MSG cipher text from the first entity, and obtaining, by the second entity, a key from the trusted third party on obtaining the MSG cipher text;

deciphering the MSG cipher text with the key, and determining that the authentication is successful if a MSG plain text is obtained or determining that the authentication fails if a MSG plain text is not obtained.

Preferably, before the trusted third party writes the MSG cipher text into the first entity, the method further includes: creating system parameters which includes two qth-order cyclic groups $(G_1,+)$ and $(G_2,\cdot)$, a generator of $G_1$ P, a private key $S_{TTP} \in Z_q^*$, a public key $Q_{TTP}=S_{TTP}P \in G_1$ and an encipher key K.

Preferably, the writing, by the trusted third party, the MSG cipher text into the first entity includes:

randomly selecting a key identifier, PKeyID, as a public key, calculating a corresponding private key, $SKeyID=PKeyID \cdot S_{TTP}$, and securely storing the private key;

selecting a secret random number, r, and calculating the $K=r \cdot Q_{TTP} \cdot PKeyID$;

enciphering the MSG with the K to obtain a corresponding cipher text, CMSG;

calculating $CP=r \cdot P$, and writing the MSG cipher text composed of the CP, the PKeyID and the CMSG into the first entity.

Preferably, obtaining, by the second entity, the MSG cipher text from the first entity includes:

sending, by the second entity, a data request message to the first entity; and sending, by the first entity, a data response message including the MSG cipher text to the second entity in response to the data request.

Preferably, the data request message is a message with empty content.

Preferably, obtaining, by the second entity, the key from the trusted third party includes:

sending, by the second entity, a key request message to the trusted third party, the key request message carrying a requested key identifier and a one-time random number;

sending, by the trusted third party, a key response message to the second entity in response to the key request message, the key response message carrying a cipher text of a key SKeyID corresponding to the key identifier, a CP1, a Nonce field and a MIC field carrying a message integrity code, wherein the cipher text of the key SKeyID is obtained by enciphering the SKeyID with an encipher key EK, the EK is educed from the K1, and $K1=r1 \cdot Q_{TTP} \cdot ID2$, where r1 is a secret random number, ID2 is identity information of the second entity, and $Q_{TTP}$ is a public key of the third entity itself;

On receiving the key response message, recalculating, by the second entity, the $K1=CP1 \cdot S_2$, where $S_2$ denotes a private key of the second entity, if a one-time random number in the Nonce field is determined to be the random number selected by itself, educing an encipher key EK and an integrity check key IK from K1, recalculating the MIC from IK, and comparing the recalculated MIC with a received MIC, and deciphering the CSKeyID with EK to obtain a SKeyID plain text if the recalculated MIC is consistent with the received MIC, or ending the procedure if the recalculated MIC is inconsistent with the received MIC.

Preferably, obtaining, by the second entity, the key from the trusted third party further includes:

ending the procedure if the one-time random number in the Nonce field is determined to be not the random number selected by the second entity.

Preferably, sending, by the trusted third party, the key response message to the second entity in response to the key request message includes:

receiving, by the trusted third party, the key request message from the second entity, authenticating the validity of the identity of the second entity, and sending the key response message to the second entity if the authentication is successful.

Preferably, another embodiment of the present invention provides a light access authentication system, including: a first entity, a second entity and a third entity which is a trusted third party, wherein:

the first entity includes a first processing apparatus adapted to receive an MSG cipher text from the third entity and supply the MSG cipher text to the second entity on receiving a data request from the second entity, the MSG cipher text carrying a CP, a PKeyID and a CMSG, where the PKeyID is a key identifier selected randomly, the CMSG is obtained by enciphering the MSG with K, where $K=r \cdot Q_{TTP} \cdot PKeyID$, r is a secret random number, $Q_{TTP}$ is a public key of the third entity, and $CP=r \cdot P$, where P is a generator;

the second entity includes a second processing apparatus adapted to obtain the MSG cipher text from the first entity, to obtain a key response message from the third entity and to determine a key, to decipher the MSG cipher text with the key, and to determine that the authentication is successful if a MSG plain text is obtained, or to determine that the authentication fails if a MSG plain text is not obtained; and the third entity includes a third processing apparatus adapted to generate the MSG cipher text, to transmit the MSG cipher text to the first entity, and to transmit the key response message to the second entity in response to the request from the second entity.

Preferably, the first entity is an electronic label and the second entity is a reader/writer.

The present invention implements access authentication using a identity-based public key mechanism and has the following advantages:

1. The maintenance workload is small. The present invention is implemented based on the identity-based public key mechanism and does not need to maintain the PKI like the conventional public mechanism.

2. The communication overhead is saved. It is unnecessary to transmit a digital certificate during the authentication, and thus the communication overhead is saved.

3. The identity authentication function is added, which can address the disadvantage that it is difficult to authenticate the validity of identity in the identity-based public key mechanism.

4. Bilinear pairings on the ellipse curve is adopted, which can shorten the length of security data without reducing the security, thereby improving the calculation and communication performance greatly.

5. The present invention may be widely applied under the condition that the equipment and environment (for example, the memory is small, etc.) is limited, such as the reader/writer and the electronic label, the IC card etc., thereby simplifying and lightening the access authentication.

BRIEF DESCRIPTION OF THE DRAWINGS

In order to make the technical solution of the embodiments of the present invention or the prior art more clearly, a brief description will be given hereinafter to the attached drawings that are necessary for the description of the embodiments or the prior art. Apparently, the attached drawings in the following description are only part of the embodiments of the present invention. For those skilled in the art, other drawings can be obtained according to these attached drawings without creative activity.

FIG. 2 is a schematic structural diagram of a data response message according to an embodiment of the present invention;

FIG. 3 is a schematic structural diagram of a cipher request message according to an embodiment of the present invention;

FIG. 4 is a schematic structural diagram of a key response message according to an embodiment of the present invention;

DETAILED DESCRIPTION OF THE INVENTION

In order to make those skilled in the art understand the technical solution of the present invention clearly, the technical solution in the embodiments of the present invention will be described clearly and fully with reference to the figures of the embodiments of the present invention. Apparently, the described embodiments are merely a part and not all of the embodiments of the present invention. Other embodiments obtained by those skilled in the art without creative activity within the disclosure of the embodiments of the present invention fall into the scope of the present invention.

The access authentication method disclosed in an embodiment of the present invention is implemented through a Trusted Third Party (TTP). The TTP may be an authentication server or other devices that can perform the authentication. The TTP is in responsible for physical authentication on the identity of a user entity, the generation of system parameters and a procedure of creating user parameters.

Figure 1:
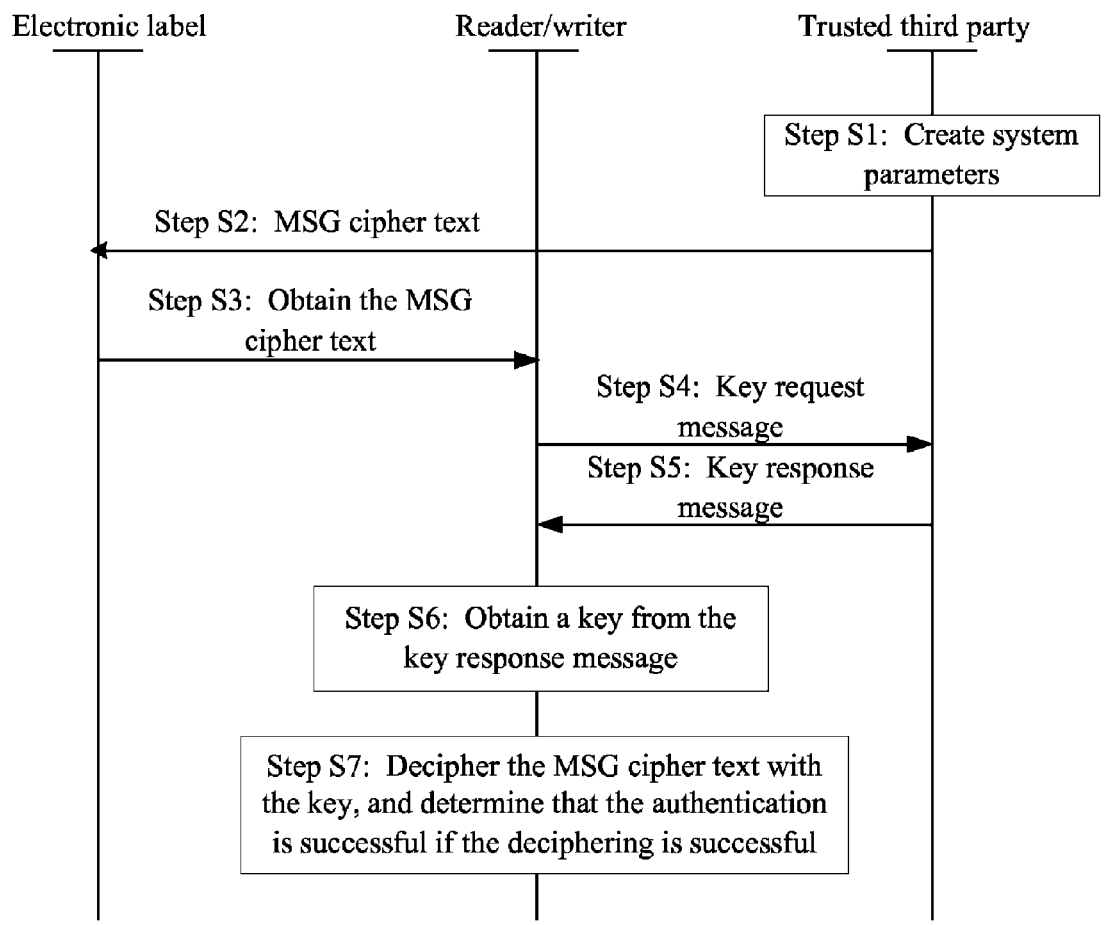
FIG. 1 is a schematic flowchart of an authentication method according to an embodiment of the present invention.

Taking a reader/writer and an electronic label for an example, detailed description will be given to an access authentication method according to an embodiment of the present invention hereinafter. As shown in FIG. 1, the specific procedure of the access authentication method includes the following steps.

Step S1: The TTP creates system parameters.

The system parameters include: two qth-order cyclic groups, $(G_1,+)$ and $(G_2,\cdot)$; a generator of $G_1$, P; bilinear transformation on $G_1$ and $G_2$, e, i.e., e: $G_1 \times G_1 \rightarrow G_2$; a private key that is randomly selected by TTP, $S_{TTP} \in Z_q^*$, and a corresponding public key, $Q_{TTP}=S_{TTP}P \in G_1$; $E_K(M)$ representative of enciphering a message M using a symmetric encipher algorithm with an encipher key K.

In the embodiment, the identity ID2 of the reader/writer is a public key of the reader/writer, and a private key of the reader/writer is $S_2=S_{TTP}ID_2$, public and private keys are not required to be calculated for the electronic label.

It should be noted that the step S1 is merely used to create the system parameters in the first application and is unnecessary in subsequent repeated applications.

Step S2: The trusted third party generates an MSG (message) and writes an MSG cipher text obtained by enciphering the MSG into the electronic label.

The specific procedure is as follows.

First, the trusted third party selects a key identifier PKeyID randomly as a public key, calculates a private key $SKeyID=PKeyID \cdot S_{TTP}$ corresponding to the public key, and securely stores the private key; next, the trusted third party selects a secret random number, r, and calculates $K=r \cdot Q_{TTP} \cdot PKeyID$; then, a corresponding cipher text, CMSG, is obtained by enciphering the MSG message with K, i.e., $CMSG=E_K(MSG)$ is calculated; finally, $CP=r \cdot P$ is calculated and the MSG cipher text composed of CP, PKeyID and CMSG is written into the electronic label; therefore, the procedure of securely writing the information of MSG cipher text into the electronic label is completed.

Step S3: The reader/writer obtains the MSG cipher text from the electronic label.

The specific procedure is as follows.

The reader/writer sends a data request to the electronic label, the data request being a message with empty content;

On receiving the data request, the electronic label sends a data response message to the reader/writer;

The structure of the data response message is shown in FIG. 2, which includes:

The PKeyID field, which is the value of PKeyID which is selected by the trusted third party and written into the electronic label;

The CP field, which is the value of CP which is calculated by the trusted third party and written into the electronic label, the value of CP is $r \cdot P$; and The CMSG field, which is the cipher text obtained by symmetrically enciphering the MSG and written into the electronic label by the trusted third party.

Step S4: The reader/writer sends a key request message to the trusted third party. The format of the key request message is shown in FIG. 3. The key request message includes an ID2 field, a TTP field, a PKeyID field and a Nonce field. In particular:

The ID2 field represents the identity information of the reader/writer;

The TTP field represents the identity information of the trusted third party;

The PKeyID field represents a requested key identifier;

The Nonce field represents a one-time random number selected by the reader/writer.

Step S5: The trusted third party sends a key response message to the reader/writer in response to the key request message.

On receiving the key request message from the reader/writer, the trusted third party may authenticate the validity of the identity of the reader/writer, ends the authentication procedure if the identity is invalid, and creates the key response message and sends the key response message to the reader/writer if the identity is valid. The format of the key response message is shown in FIG. 4, in which the key response message includes: the ID2 field, the TTP field, a CSkeyID field, a CP1 field, a Nonce field and a MIC field. In particular:

The ID2 field represents the identity of the reader/writer;

The TTP field represents the identity of the trusted third party;

The CSkeyID field represents the cipher text of the requested key SKeyID. The calculation procedure may be as follows: the trusted third party selects a secret random number, r1, calculates $K1=r1 \cdot Q_{TTP} \cdot ID2$; and an encipher key, EK, and an integrity check key, IK, are educed from K1; then, the corresponding cipher text CSKeyID is obtained by enciphering the SKeyID with EK, i.e., $CSKeyID=E_{EK}(SKeyID)$ is calculated;

The CP1 field is given by $CP1=r1 \cdot P$;

The Nonce field represents a one-time random number selected by the reader/writer; and The MIC field is obtained from all fields before the MIC field by using the IK educed from the K1.

Step S6: The reader/writer obtains a key from the key response message.

On receiving the key response message, the reader/writer determines whether the Nonce in the key response message is the random number selected by itself, and ends the authentication procedure if the Nonce in the key response message is not the random number selected by itself; the reader/writer recalculates the $K1=CP1 \cdot S_2$ if the Nonce in the key response message is the random number selected by itself, and educes an encipher key, EK, and an integrity check key, IK, from K1. The MIC may be recalculated from IK and compared with the received MIC to authenticate the validity of the key response message. If the recalculated MIC is consistent with the received MIC, it indicates that the key response message is valid, and a SKeyID plain text is obtained by deciphering the CSKeyID with EK.

Step S7: The reader/writer deciphers the received MSG cipher text with the key, and determines that the authentication is successful if the deciphering is successful.

On obtaining the SKeyID plain text, the reader/writer calculates the $K=CP \cdot SKeyID$ according to the content of the received data response message, and finally, a MSG plain text may be obtained by deciphering the CMSG with K as a key. If the recalculated MIC is not consistent with the received MIC, it indicates that the key response message is invalid and the procedure is ended.

In the above procedure, the function of securely writing of the data information can be implemented in the step S2; the function of reading and authenticating the data information is implemented in the steps S3 to S6. Therefore, the secure access authentication of the electronic label is achieved.

Figure 5:
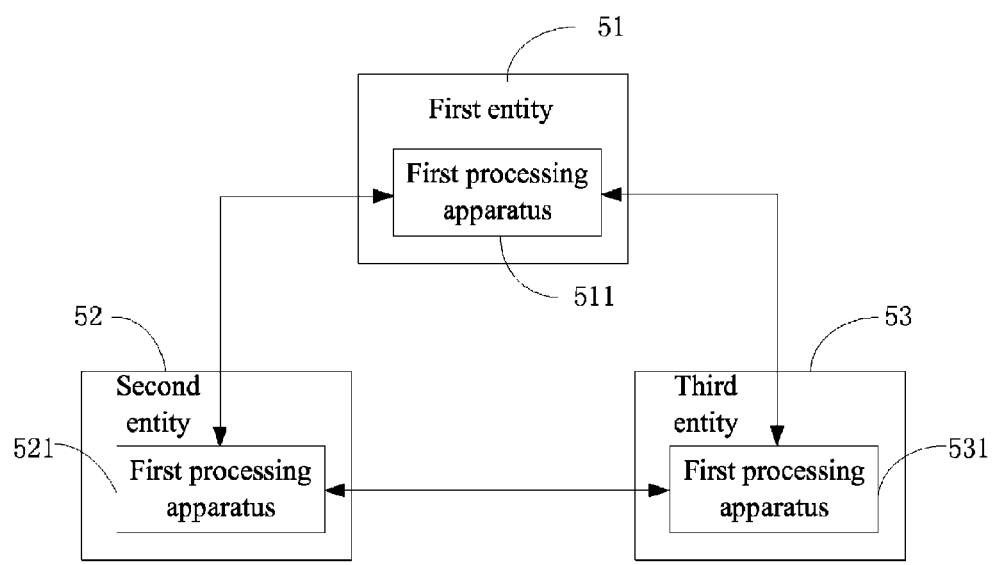
FIG. 5 is a schematic structural diagram of an authentication system according to an embodiment of the present invention.

As shown in FIG. 5, an embodiment of the present invention provides an access authentication system, which includes: a first entity 51, a second entity 52 and a third entity 53. The third entity 53 is a trusted third party with respect to the first entity 51 and the second entity 52.

In particular:

The first entity 51 includes a first processing apparatus 511 adapted to receive a MSG cipher text (including a CP, a PKeyID and a CMSG) from the third entity 53 and to supply the MSG cipher text to the second entity 52 on receiving a data request from the second entity 52.

The second entity 52 includes a second processing apparatus 521 adapted to obtain the MSG cipher text including the CP, the PKeyID and the CMSG from an electronic label, to obtain a key response message from the third entity 53 to determine a key, to decipher the CMSG with the key, and to determine that the authentication is successful if a MSG plain text is obtained from the deciphering, or, to determine that the authentication fails if a MSG plain text can not be obtained from the deciphering. Reference may be made to the description of the foregoing method for the specific procedure.

The third entity 53 includes a third processing apparatus 531 adapted to generate the MSG cipher text including the CP, the PKeyID and the CMSG, and to transmit the MSG cipher text to the first entity 51, and to transmit the key response message to the second entity 52 in response to a request from the second entity 52. Reference may be made to the description of the foregoing method for the specific procedure.

The authentication system according to the embodiment of the present invention may be applied to the RFID, in which the first entity 51 is an electronic label, the second entity 52 is a reader/writer and the third entity 53 is a trusted third party.

It should be noted that both the reader/writer including the above second processing apparatus 521 and a RFID including the above reader/writer and the electronic label belong to the scope of the present invention.

The above description of the disclosed embodiments enables those skilled in the art to realize or use the present invention. It is apparent to those skilled in the art to implement a plurality of modification on these embodiments. The general principle defined in this paper may be realized in other embodiments without deviating the spirit or scope of the present invention. Therefore, the present invention will not be limited to the embodiments described in this paper, but shall accord with a widest scope in correspondence with the principle and novelty disclosed in this paper.

The invention claimed is:

1. A light access authentication method, comprising:
enciphering, by a third processing apparatus of a trusted third party, an MSG to obtain a MSG cipher text, and writing, by the third processing apparatus of the trusted third party, the MSG cipher text into a first entity;
obtaining, by a second processing apparatus of a second entity, the MSG cipher text from a first processing apparatus of the first entity, and obtaining, by the second processing apparatus of the second entity, a key from the trusted third party on obtaining the MSG cipher text; and
deciphering, by the second processing apparatus of the second entity, the MSG cipher text with the key, and determining that the authentication is successful if a MSG plain text is obtained or determining that the authentication fails if a MSG plain text is not obtained.

2. The method according to claim 1, wherein before the trusted third party writes the MSG cipher text into the first entity, the method further comprises: creating system parameters which comprises two qth-order cyclic groups $(G_1,+)$ and $(G_2,\cdot)$, a generator of $G_1$ P, a private key $S_{TTP} \in Z_q^*$, a public key $Q_{TTP}=S_{TTP}P \in G_1$ and an encipher key K.

3. The method according to claim 2, wherein the writing, by the trusted third party, the MSG cipher text into the first entity comprises:
randomly selecting a key identifier, PKeyID, as a public key, calculating a corresponding private key, $SKeyID=PKeyID \cdot S_{TTP}$, and securely storing the private key;
selecting a secret random number, r, and calculating the $K=r \cdot Q_{TTP} \cdot PKeyID$;
enciphering the MSG with the K to obtain a corresponding cipher text, CMSG; and
calculating $CP=r \cdot P$, and writing the MSG cipher text composed of the CP, the PKeyID and the CMSG into the first entity.

4. The method according to claim 3, wherein obtaining, by the second entity, the MSG cipher text from the first entity comprises:
sending, by the second entity, a data request message to the first entity; and
sending, by the first entity, a data response message including the MSG cipher text to the second entity in response to the data request.

5. The method according to claim 4, wherein the data request message is a message with empty content.

6. The method according to claim 4, wherein obtaining, by the second entity, the key from the trusted third party comprises:
sending, by the second entity, a key request message to the trusted third party, the key request message carrying a requested key identifier and a one-time random number;
sending, by the trusted third party, a key response message to the second entity in response to the key request message, the key response message carrying a cipher text of a key SKeyID corresponding to the key identifier, a CP1, a Nonce field and a MIC field carrying a message integrity code, wherein the cipher text of the key SKeyID is obtained by enciphering the SKeyID with an encipher key EK, the EK is educed from the K1, and $K1=r1 \cdot Q_{TTP} \cdot ID2$, where r1 is a secret random number, ID2 is identity information of the second entity, and $Q_{TTP}$ is a public key of the third entity itself; and
On receiving the key response message, recalculating, by the second entity, the $K1=CP1 \cdot S_2$, where $S_2$ denotes a private key of the second entity, if a one-time random number in the Nonce field is determined to be the random number selected by itself, reducing an encipher key EK and an integrity check key IK from K1, recalculating the MIC from IK, and comparing the recalculated MIC with a received MIC, and deciphering the CSKeyID with EK to obtain a SKeyID plain text if the recalculated MIC is consistent with the received MIC, or ending the procedure if the recalculated MIC is inconsistent with the received MIC.

7. The method according to claim 6, wherein obtaining, by the second entity, the key from the trusted third party further comprises:
ending the procedure if the one-time random number in the Nonce field is determined to be not the random number selected by the second entity.

8. The method according to claim 6, wherein sending, by the trusted third party, the key response message to the second entity in response to the key request message comprises:
receiving, by the trusted third party, the key request message from the second entity, authenticating the validity of the identity of the second entity, and sending the key response message to the second entity if the authentication is successful.

9. A light access authentication system, comprising: a first entity, a second entity and a third entity which is a trusted third party, wherein:
the first entity comprises a first processing apparatus adapted to receive an MSG cipher text from the third entity and supply the MSG cipher text to the second entity on receiving a data request from the second entity, the MSG cipher text carrying a CP, a PKeyID and a CMSG, where the PKeyID is a key identifier selected randomly, the CMSG is obtained by enciphering the MSG with K, where $K=r \cdot Q_{TTP} \cdot PKeyID$, r is a secret random number, $Q_{TTP}$ is a public key of the third entity, and $CP=r \cdot P$, where P is a generator;
the second entity comprises a second processing apparatus adapted to obtain the MSG cipher text from the first entity, to obtain a key response message from the third entity and to determine a key, to decipher the MSG cipher text with the key, and to determine that the authentication is successful if a MSG plain text is obtained, or to determine that the authentication fails if a MSG plain text is not obtained; and
the third entity comprises a third processing apparatus adapted to generate the MSG cipher text, to transmit the MSG cipher text to the first entity, and to transmit the key response message to the second entity in response to the request from the second entity.

10. The system according to claim 9, wherein the first entity is an electronic label and the second entity is a reader/writer.

* * * * *